United States Patent
Wunsch et al.

(10) Patent No.: US 7,393,451 B2
(45) Date of Patent: Jul. 1, 2008

(54) WATER SCREEN SYSTEM WITH COMPRESSIBLE BOOT SEAL

(75) Inventors: Philip J. Wunsch, New Orleans, LA (US); Rocky Portillo, Junction City, AR (US)

(73) Assignee: Laitram, L.L.C., Harahan, LA (US)

( * ) Notice: Subject to any disclaimer, the term of this patent is extended or adjusted under 35 U.S.C. 154(b) by 61 days.

(21) Appl. No.: 11/539,808

(22) Filed: Oct. 9, 2006

(65) Prior Publication Data

US 2008/0083665 A1  Apr. 10, 2008

(51) Int. Cl.
*E03F 5/14* (2006.01)
*B01D 33/80* (2006.01)

(52) U.S. Cl. .................. 210/160; 210/400; 210/541; 428/122; 49/490.1; 277/647

(58) Field of Classification Search ........... 210/160, 210/400, 401, 541, 542; 428/122; 49/490.1; 277/630, 637, 647
See application file for complete search history.

(56) References Cited

U.S. PATENT DOCUMENTS

| | | | |
|---|---|---|---|
| 1,925,251 A * | 9/1933 | Hobart ................ 210/160 |
| 2,286,332 A * | 6/1942 | Bleyer ................ 210/160 |
| 3,093,578 A | 6/1963 | Hofmeister | |
| 3,768,819 A * | 10/1973 | Burkert ............... 277/647 |
| 3,802,565 A | 4/1974 | Hughes et al. | |
| 3,850,804 A * | 11/1974 | Taylor et al. ........... 210/400 |
| 3,922,460 A * | 11/1975 | Jackson .............. 49/490.1 |
| 4,176,984 A | 12/1979 | Sommers | |
| 4,186,091 A | 1/1980 | Sutton | |
| 4,188,294 A | 2/1980 | Hagihara | |
| 4,360,426 A | 11/1982 | Wetzel | |
| 4,399,644 A * | 8/1983 | Bright ................. 428/122 |
| 4,582,601 A | 4/1986 | Strow et al. | |
| 4,775,570 A * | 10/1988 | Ohlenforst et al. ....... 428/122 |
| 5,415,766 A | 5/1995 | Quick et al. | |
| 5,489,378 A | 2/1996 | Cheesman et al. | |
| 5,501,793 A | 3/1996 | Cheesman et al. | |
| 5,565,093 A * | 10/1996 | Frankenberger ......... 210/160 |
| 5,573,659 A * | 11/1996 | Johnson, Jr. ............ 210/160 |
| 5,741,573 A * | 4/1998 | Malm ................. 49/490.1 |
| 6,187,184 B1 | 2/2001 | Reetz et al. | |
| 6,280,612 B1 * | 8/2001 | Kroos ................. 210/160 |
| 7,048,850 B2 | 5/2006 | DePaso et al. | |
| 2006/0037897 A1 | 2/2006 | Jackson | |
| 2007/0215532 A1 * | 9/2007 | Wunsch et al. .......... 210/160 |

* cited by examiner

*Primary Examiner*—Christopher Upton
(74) *Attorney, Agent, or Firm*—James T. Cronvich

(57) ABSTRACT

A compressible boot seal for sealing the side of a vertical traveling water screen with flights. The boot seal is formed by a U-shaped, bent nylon plate having a bottom base that resides in the boot section at the lower end of the traveling water screen and two upwardly extending arms that are attached at their distal ends to a side of the water screen support. The plate is bent at the intersection of the base and the arms to form a living hinge that allows the plate to deflect toward the side of the support on contact with side edges of the flights. The hinge seals the plate against the side edges of the flights. A resilient filler material fills the void between the plate and the side of the support to prevent sand and debris from interfering with the deflection of the side seal.

24 Claims, 3 Drawing Sheets

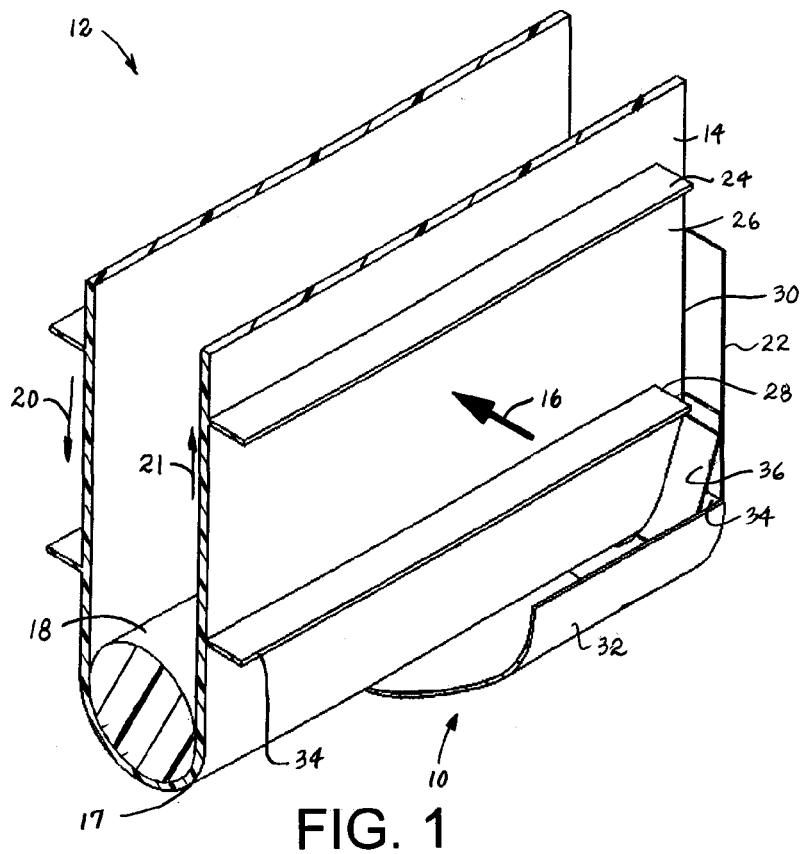
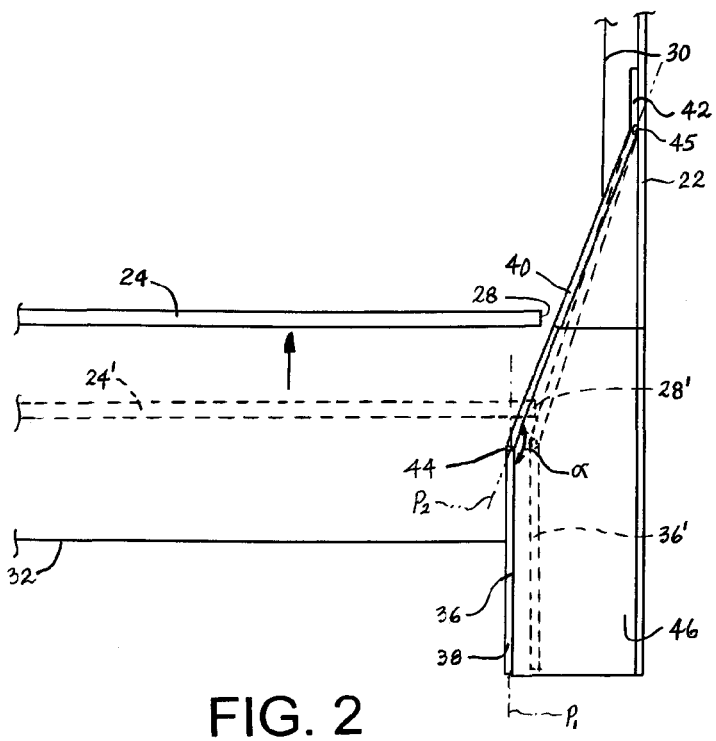

WATER SCREEN SYSTEM WITH COMPRESSIBLE BOOT SEAL

BACKGROUND

The invention relates generally to water screens and, more particularly, to traveling water screen systems with boot seals.

Water drawn into an industrial plant from a lake or river must be filtered to prevent debris from fouling equipment and causing damage. Traveling water screens are used to filter out and remove debris and fish from an influent channel before the debris can enter the plant or fish impinged on the upstream face of the screen die. A typical traveling water screen comprises a motor-driven screen, such as a foraminous conveyor belt, extending laterally across the width of the channel and vertically from the bottom of the channel to a height above the level of the water to ensure that all the water flowing in the channel passes through the screen. The screen travels a circuitous path around a motor-driven head shaft above the level of the water and a lower idle shaft in a boot section of the water screen at the bottom of the channel. The screen travels upward along the upstream portion of its circuitous path and downward along the downstream portion. A series of lift elements, such as baskets, scoops, or flights, extending outward of the screen at periodic intervals along its length lift debris or fish trapped on the upward-moving upstream portion of the water screen out of the channel for disposal in the case of debris and safe transit in the case of fish. Seals prevent unfiltered water containing fish and debris from flowing into the boot section of the water screen system between the screen and the bottom of the channel. A rubber flap or a metal plate attached at one end upstream of the boot section and extending over the upstream lip of the boot section are used as boot seals. The flap or plate backflexes by contact with the upwardly advancing flight exiting the boot section, its downstream end sliding along the tip of the flight to maintain the seal. Once the flight passes, the flap or metal plate, biased against the upward advance of the water screen, returns to its unflexed, sealed position with its downstream end close to the upstream face of the screen. While these seals form a seal with the tips of the flights, they do not form a seal at the side edges of the flights without custom modification. Furthermore, the biased metal plate seal allows the water screen to be advanced in a single direction and can be damaged if the water screen's direction of motion is reversed.

SUMMARY

These shortcomings are overcome in a water screen system embodying features of the invention. In one aspect of the invention, a water screen system comprises a vertically traveling water screen that has an outer screen surface from which rows of flights extend outwardly and laterally across the width of the water screen between first and second flight side edges. The traveling water screen changes direction between a downstream path and an upstream path at its lower end. Water screen support structure confines the water screen between opposite first and second sides. A boot plate forms a trough in which the lower end of the water screen is received. The trough extends from the first side to the second side of the support structure. A first side seal is positioned at the first side of the support structure at the lower end of the water screen. The seal includes a first plate received in the boot plate trough. Wear surfaces on the plate are resiliently compressible toward the first side of the support structure by contact with the passing first flight side edges. A similar second side seal is positioned at the opposite second side of the support structure. The side seals form compressible seals between the side edges of the flights and the sides of the support structure.

In another aspect of the invention, a traveling water screen system comprises a vertically traveling water screen having rows of flights extending outwardly from an outer screen surface and laterally across the width of the water screen. The traveling water screen changes direction between a downstream path and an upstream path at its lower end. Water screen support structure includes a first side and an opposite second side confining the water screen. A boot plate forms a trough that extends laterally from a first closed end to a second closed end between the first and second sides of the support structure for receiving the lower end of the water screen. A first side seal is positioned at the first side of the support structure at the lower end of the water screen. The seal includes a first wear plate defining a U-shaped profile. A bottom base is received in the boot plate trough inward of the first side. A first arm extends upward from the base downstream of the water screen, and a second arm extends upward from the base upstream of the water screen. The distal ends of the arms opposite the base are fastened to the first side of the support structure above the boot plate with the arms angled away from the distal ends at the first side downward to the base. A first resilient filler is disposed between the first wear plate and the first side of the support structure. A similar second side seal is positioned against the water screen at the second side of the support structure.

In yet another aspect of the invention, a boot seal comprises a resilient plate having a base and a pair of arms extending from the base to define a U-shaped profile. The base defines a first plane and the pair of arms defines a second plane oblique to the first plane.

BRIEF DESCRIPTION OF THE DRAWINGS

These features, aspects, and advantages of the invention are better understood by reference to the following description, appended claims, and accompanying drawings, in which:

FIG. 1 is an isometric view, partly cut away, of one side of the boot section of a water screen system embodying features of the invention including a compressible side seal;

FIG. 2 is a front elevation view of the compressible side seal of FIG. 1;

DETAILED DESCRIPTION

Figure 3:
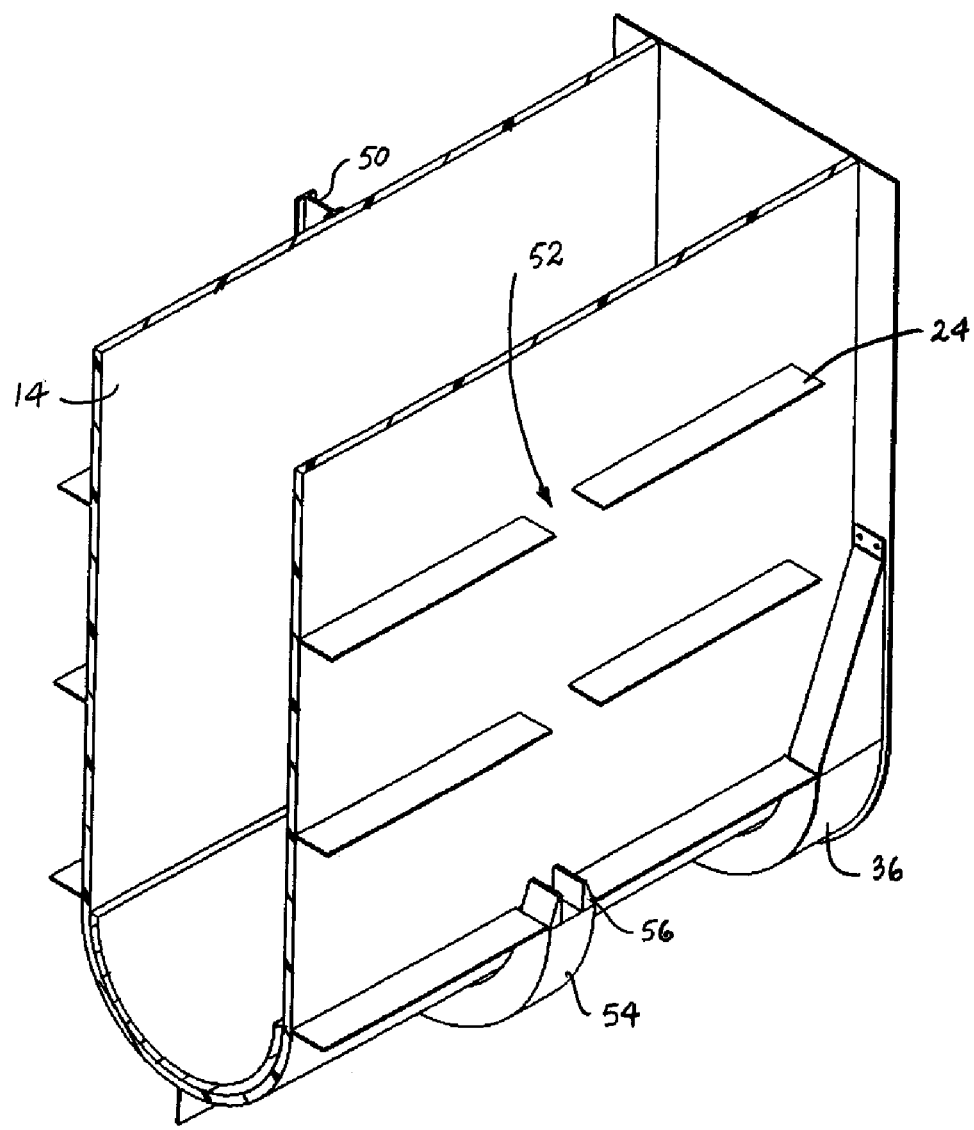
FIG. 3 is an isometric view of a portion of a water screen system as in FIG. 1, but with an interior seal as well as a side seal and with the boot plate removed for clarity.

A portion of the boot section 10 of a vertical traveling water screen embodying features of the invention is shown in FIG. 1. The water screen system 12 includes a traveling water screen 14 positioned in a channel through which water flows in the direction of the arrow 16. One or more wheels 18, such as sprockets, pulleys, or drums, at a lower end 17 of the water screen transition it from a downstream path 20 to an upstream path 21. In normal operation, the water screen travels upward on the upstream path and downward on the downstream path. But the water screen may be driven in reverse. The wheel in the boot section rotates on a laterally disposed shaft whose ends are supported for rotation in first and second sides 22, 23 of a water screen support structure. Opposition the boot section of the water screen system is a head section above the surface of the water in the channel. A motor-driven drive wheel in the head section drives the water screen upward on the upstream path and downward on the downstream return path.

The water screen 14 is preferably a modular polymeric belt with significant open area to allow the stream to flow through. Rows of periodically spaced flights 24 extend outward from an outer surface 26 of the water screen. Each row of flights extends laterally across the water screen to flight side edges 28, which may be recessed inward of the corresponding side edge 30 of the water screen. The flights lift debris and fish that collect on the upstream side of the water stream out of the channel for disposal in the case of debris and safe removal and return to the water in the case of fish.

The lower end 17 of the water screen is received in a boot plate 32 in the form of a laterally extending trough closed at both ends 34 by end plates or the sides 22 of the support structure. The boot plate trough forms a generally semicircular or arcuate bottom sized to allow tip ends 34 of the flights to rotate through with a slight clearance, such as 0.6 cm (about 0.25 in).

To prevent debris and fish from passing beneath the water screen, a side seal 36 is attached to the side 22 of the support structure. As better shown in FIGS. 2 and 4, the side seal is U-shaped in profile viewed along the axis of the boot plate trough 32. The side seal has a base plate 38 shaped to fit in the boot plate trough. Two arm plates 40, 41 extend upward from the base plate. Distal ends of the arms opposite the base have attachment tabs 42, 43 that may be fastened by bolts or the like to the side 22 of the support structure above the boot plate. The arms bend outward from the tabs at hinge joints 45 to meet the base, which is spaced inward of the side of the support structure. The arms intersect the base at hinge joints 44. The base plate lies in a generally vertical first plane $P_1$, and the arms lie in an oblique plane $P_2$. The base and the arms define an obtuse angle $\alpha$ at the hinge joint. The U-shaped side seal forms a notch 46 sized to accommodate the lower end of the water screen with minimal clearance. The width of the arms of the side seal is about equal to the height of the flights.

The operation of the side seal is best shown in FIG. 2. The side edge 28' of a flight 24' moving upward on the upstream path pushes against the side seal, which deflects into a compressed position 36' (dashed lines). The living hinge joints 44, 45 naturally bias the resilient U-shaped plate, preferably made of nylon for resilience and durability, away from the side 22 of the support structure. This forms a tight seal between the side edge 28' of the flight and the outer wear surface of the side seal plate. As the flight continues to rise, it eventually comes out of contact with the side seal, which can resiliently return to its relaxed state 36 (solid lines). To keep sand and debris from interfering with the deflection of the side seal, a filler 46 fills the void between the side seal plates and the side of the support structure. The filler material is compressible and resilient to allow the side seal plates to flex as the water screen flights push against it. A foam material, especially an open-cell, polyurethane foam suitable for washdown applications, is preferred for its high tensile strength, softness, and water resistance. The filler may be glued or otherwise attached to the outer side of the side seal plate, or it may be retained in place in the void without physical attachment to the seal plates. The symmetry of the U-shaped side seal allows the water screen to be operated in either direction, for example, in reverse to clear a jam, without damaging the seal.

Figure 4:
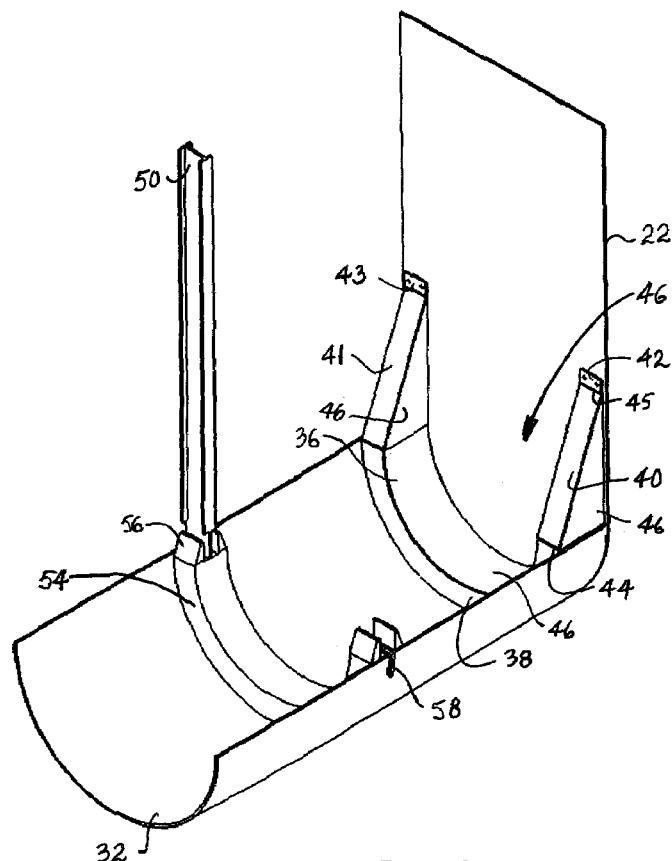
FIG. 4 is an isometric view of a portion of the boot plate including the interior seal and the side seal of FIG. 3.
Figure 5:
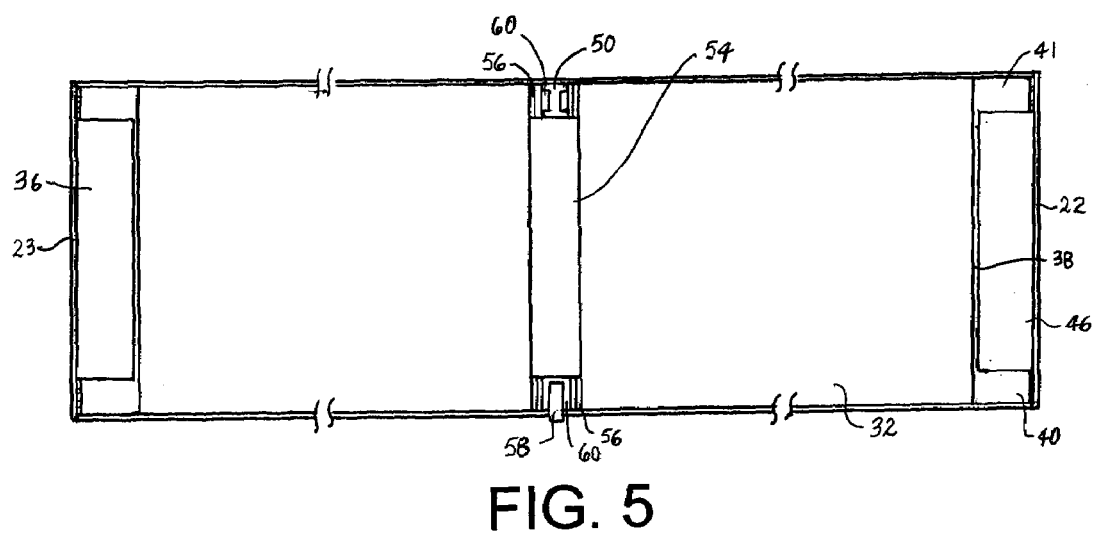
FIG. 5 is a top plan view of the boot section of the water screen system of FIG. 3.

As seen in FIGS. 3-5, an additional seal is useful with wide water screens that require additional support against the force of the water flow midway between the sides of the support structure. In this wide version, a beam 50, such as an I-beam, extends vertically along the water screen 14 on the downstream side. The beam prevents the water screen from bowing downstream. To accommodate the supporting beam, a gap 52 is formed in each row of flights 24. The gaps in the rows are positioned along the width of the water screen in vertical alignment. An interior seal 54 resides in the boot plate trough 32 generally midway between the two sides 22, 23 of the support structure to line up with the aligned gaps in the flights. The interior seal is formed by a raised arcuate strip defining a narrow band of reduced diameter about the inner circumference of the boot plate. The thickness of the strip is about equal to the height of the flight above the outer surface 26 of the water screen. The ends of the strip terminate in pairs of wedge-shaped guards 56. The guards at one end of the strip are beveled with ramped surfaces 56 to maintain the water screen in alignment by guiding the flights' interior edges that are spaced across the gaps. The I-beam and a retention clip 58 are received in recesses 60 at the ends of the strip. The retention clip hooks around the lip of the boot plate to retain the inner seal in place. Unlike the side seals 36, the inner seal does not have to be compressible. Preferably the strip is made of an ultra-high molecular weight (UHMW) plastic for durability.

What is claimed is:

1. A traveling water screen system comprising:
a vertically traveling water screen having an outer screen surface and rows of flights extending outwardly from the outer screen surface and laterally across the width of the water screen between first and second flight side edges, the traveling water screen changing direction between a downstream path and an upstream path at a lower end of the water screen;
water screen support structure including a first side and an opposite second side confining the water screen;
a boot plate forming a trough extending from the first side to the second side of the support structure for receiving the lower end of the water screen;
a first side seal disposed at the first side of the support structure at the lower end of the water screen and including:
a first plate received in the boot plate trough and having wear surfaces resiliently compressible toward the first side of the support structure by contact with the passing first flight side edges;
a second side seal disposed at the second side of the support structure at the lower end of the water screen and including:
a second plate received in the boot plate trough and having wear surfaces resiliently compressible toward the second side of the support structure by contact with the passing second flight side edges.

2. A traveling water screen system as in claim 1 further comprising:
a first filler disposed between the first plate and the first side; and
a second filler disposed between the second plate and the second side.

3. A traveling water screen system as in claim 2 wherein the first filler and the second filler are made of a resilient compressible material.

4. A traveling water screen system as in claim 2 wherein the first filler and the second filler are made of a foam material.

5. A traveling water screen as in claim 1 wherein the first and second plates are made of nylon.

6. A traveling water screen system as in claim 1 wherein each of the first and second plates includes a base and a pair of arms extending from the base to define a U-shaped profile, wherein the base defines a first plane and the pair of arms defines a second plane oblique to the first plane.

7. A traveling water screen as in claim 6 wherein the first plate is fastened to the first side of the support structure at distal ends of the pair of arms opposite the base and wherein the second plate is fastened to the second side of the support structure at distal ends of the pair of arms opposite the base.

8. A traveling water screen system as in claim 1 wherein each of the first and second plates has a U-shaped profile formed by a base and a pair of arms joining the base at a pair of hinge joints, wherein the base forms an obtuse angle with the pair of arms.

9. A traveling water screen system as in claim 1 wherein each of the first and second plates includes a base and a pair of arms extending from the base to define a U-shaped profile with a notch between the arms to admit the lower end of water screen.

10. A traveling water screen system as in claim 1 further comprising:
vertically aligned gaps in the rows of flights at a lateral position between the first and second side edges of the flights;
a vertical beam positioned in the aligned gaps downstream of the water screen to support the water screen; and
an interior seal disposed in the boot seal trough and forming a raised arcuate strip closely received in the aligned gaps as the water screen travels through the boot plate trough.

11. A traveling water screen system as in claim 10 wherein the vertical beam is attached at a lower end to the interior seal.

12. A traveling water screen system comprising:
a vertically traveling water screen having an outer screen surface and rows of flights extending outwardly from the outer screen surface and laterally across the width of the water screen, the traveling water screen changing direction between a downstream path and an upstream path at a lower end of the water screen;
water screen support structure including a first side and an opposite second side confining the water screen;
a boot plate forming a trough extending laterally from a first closed end to a second closed end between the first and second sides of the support structure for receiving the lower end of the water screen;
a first side seal disposed at the first side of the support structure at the lower end of the water screen and including:
a first wear plate defining a U-shaped profile and having a bottom base received in the boot plate trough inward of the first side, a first arm extending upward from the base downstream of the water screen, and a second arm extending upward from the base upstream of the water screen, wherein the distal ends of the arms opposite the base are fastened to the first side above the boot plate with the arms angled away from the distal ends at the first side downward to the base; and
a first resilient filler disposed between the first wear plate and the first side;
a second side seal disposed at the second side of the support structure at the lower end of the water screen and including:
a second wear plate defining a U-shaped profile and having a bottom base received in the boot plate trough inward of the second side, a first arm extending upward from the base downstream of the water screen, and a second arm extending upward from the base upstream of the water screen, wherein the distal ends of the arms opposite the base are fastened to the second side above the boot plate with the arms angled away from the distal ends at the second side downward to the base;
a second resilient filler disposed between the second wear plate and the second side.

13. A traveling water screen system as in claim 12 wherein the first resilient filler and the second resilient filler are made of a foam material.

14. A traveling water screen as in claim 12 wherein the first and second wear plates are made of nylon.

15. A traveling water screen system as in claim 12 wherein the bottom base of each of the first and second wear plates defines a first plane and the first and second arms of each of the first and second wear plates define a second plane oblique to the first plane.

16. A traveling water screen system as in claim 12 wherein the bottom base of each of the first and second wear plates forms an obtuse angle with the first and second arms.

17. A traveling water screen system as in claim 12 wherein the U-shaped profile of each of the first and second wear plates defines a notch between the first and second arms sized to admit the lower end of water screen.

18. A traveling water screen system as in claim 12 further comprising: vertically aligned gaps in the rows of flights at a central lateral position of the water screen;
a vertical beam positioned in the aligned gaps downstream of the water screen to support the water screen; and
an interior seal disposed in the boot seal trough and forming a raised arcuate strip closely received in the aligned gaps as the water screen travels through the boot plate trough.

19. A traveling water screen system as in claim 18 wherein in vertical beam is attached at a lower end to the interior seal.

20. A boot seal for a water screen, the boot seal comprising a plate made of a resilient material and having a base and a pair of arms extending from the base to define a U-shaped profile, wherein the base defines a first plane and the pair of arms defines a second plane oblique to the first plane.

21. A boot seal as in claim 20 further comprising a living hinge formed at intersection of each of the pair of arms and the base.

22. A boot seal as in claim 20 wherein the plate is made of nylon.

23. A boot seal as in claim 20 wherein the base forms an obtuse angle with the pair of arms.

24. A boot seal as in claim 20 wherein the boot seal further comprises attachment tabs at distal ends of the pair of arms opposite the base.

* * * * *